W. V. TURNER.
ELECTROPNEUMATIC BRAKE.
APPLICATION FILED FEB. 20, 1918.
1,286,841.
Patented Dec. 3, 1918.
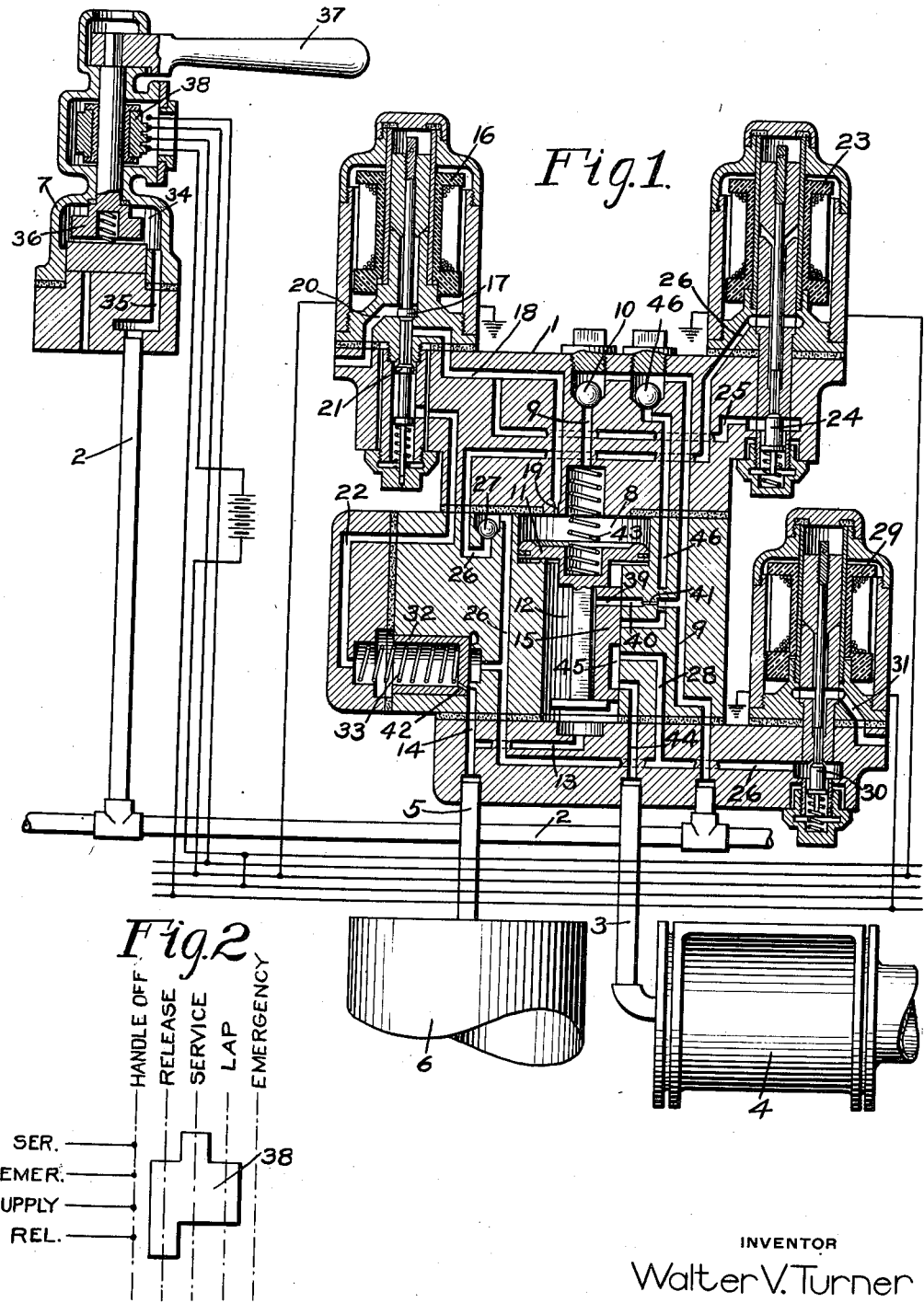
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

1,286,841.

Specification of Letters Patent.

Patented Dec. 3, 1918.

Application filed February 20, 1918. Serial No. 218,359.

*To all whom it may concern:*

Be it known that I, WALTER V. TURNER, a citizen of the United States, residing at Wilkinsburg, in the county of Allegheny and State of Pennsylvania, have invented new and useful Improvements in Electropneumatic Brakes, of which the following is a specification.

This invention relates to electro-fluid pressure brakes adapted to be employed on railway vehicles.

One of the features of my prior pending application, Serial No. 164,640, filed April 26, 1917, consists in providing means for insuring the quick release of the brakes after an emergency application, in which the emergency valve device is adapted in emergency position to connect a pipe with the brake pipe and then by operating an electrically controlled valve, such as the service magnet valve, a fluid is supplied to said pipe and thence to the brake pipe.

If, however, an emergency application of the brakes should be effected, and the magnet valve should happen to be in open position, then fluid would be supplied to the brake pipe during an emergency application of the brakes and thus cause a loss of fluid under pressure and the possible failure of the brakes.

One object of my invention is to overcome the above difficulty by controlling the communication, through which the magnet valve supplies fluid to the brake pipe, by the emergency application magnet valve, so that when an emergency application of the brakes is made, the service magnet valve, even if stuck open, cannot supply fluid to the brake pipe.

Other objects and advantages will appear in the following more detailed description of the invention.

In the accompanying drawing, Figure 1 is a diagrammatic view, partly in section, of an electro-fluid pressure brake equipment embodying my invention; and Fig. 2 a diagrammatic view, showing the connections made in the different positions of the brake switch.

As shown in Fig. 1 of the drawing, the equipment may comprise an electro-fluid pressure brake controlling valve device 1, connected to brake pipe 2, by pipe 3, to brake cylinder 4, and by pipe 5 to a supply reservoir, such as main reservoir 6.

A combined brake valve and brake switch 7 controls the pressure in brake pipe 2 and the electric circuits of the brake controlling valve device 1.

The valve device 1 may comprise a casing having a piston chamber 8 connected by passage 9, containing a ball check valve 10, with brake pipe 2, and containing an emergency piston 11, and having a valve chamber 12, connected by passages 13 and 14 to reservoir pipe 5, and containing a slide valve 15 adapted to be operated by piston 11.

For controlling the brakes electrically, an emergency magnet 16 is provided for operating a double beat valve comprising a valve 17 for venting fluid from piston chamber 8 through a passage 18 having a restricted portion 19 to an atmospheric exhaust port 20, and a valve 21 for controlling communication from a supply passage 22 to passage 18.

A service application magnet 23 controls a valve 24 adapted to vent fluid from a passage 25 leading to passage 18, to a passage 26, containing a check valve 27 and having a branch passage 28 leading to the seat of slide valve 15.

For controlling the electric release of the brakes, a release magnet 29 is provided for operating a release valve 30 adapted to control communication from passage 26 to an atmospheric exhaust passage 31.

For effecting an electric service application of the brakes, the valve 24 controls the operation of a relay valve 32, subject on one side to the pressure of a spring 33 and having the spring side connected to passage 22 and having the inner seated area on the opposite side connected to passage 26 and the outer seated area to supply passage 14.

The combined brake valve and brake switch 7 may comprise a casing having a valve chamber 34 connected by passage 35 with brake pipe 2 and containing a rotary valve 36. A brake valve handle 37 is provided for operating the rotary valve 36 and a movable contact 38, which controls the various brake circuits.

In operation, fluid from the main reservoir 6 flows through pipe 5 and passages 14 and 13 to valve chamber 12 and thence through port 39 to passage 40 having a restricted portion 41 and connected to brake pipe passage 9. Fluid also flows through passage 14 to the outer seated area of valve 32 and thence through a restricted port 42 to passage 22.

The object of providing port 39 is so that the reservoir on a trailer car not having a compressor may be charged from the brake pipe.

When the emergency magnet 16 is energized, as is normally the case, fluid flows from passage 22 past the open valve 17 to passage 18 and thence to piston chamber 8, and since the fluid pressures on opposite sides of piston 11 are thus equalized, the spring 43 maintains piston 11 in release position, as shown in the drawing.

Fluid can also flow from piston chamber 8 through passage 9 past check valve 10, so as to charge the brake pipe 2.

In release, the magnet 29 is energized, so as to open the valve 30 and permit the exhaust of fluid from the brake cylinder 4, through passage 44, cavity 45, and passages 28 and 26 to exhaust port 31.

If it is desired to effect a service application of the brakes, the release magnet 29 is deënergized to effect the closure of valve 30 and the service magnet 23 is energized, so that fluid is vented from the spring side of relay valve 32 through passages 22, 18, and 25, past valve 24, to passage 26 and thence through passage 28, cavity 45, and passage 44 to brake cylinder 4. The main reservoir pressure acting on the exposed area of valve 32 then operates to open the valve so that fluid is supplied from the main reservoir 6 to passage 26 and thence through cavity 45 to the brake cylinder 4.

After a service application, the brakes may be released by energizing the release magnet 29, as will be evident.

An emergency application of the brakes may be effected by deënergizing the emergency magnet 16, which operates to close the valve 21 and open the valve 17, so as to vent fluid from piston chamber 8 through passage 18 to exhaust port 20.

The piston 11 then operates the slide valve 15, so as to open passage 44 to valve chamber 12, thus permitting fluid from the main reservoir 6 to flow to the brake cylinder 4.

In order to release the brakes after an emergency application, the emergency magnet 16 is energized so as to effect the closing of valve 17 and the opening of valve 21.

Fluid will now be admitted to piston chamber 8 from the main reservoir 6 through passage 14, restricted port 42 in relay valve 32, passage 22, and passage 18, and upon equalization of fluid pressures on the piston 11, the spring 43 will return the parts to release position, in which fluid is exhausted from brake cylinder 4 through cavity 45, passages 28 and 26 and past the open release valve 30 to exhaust port 31.

In order to hasten the release of the brakes after an emergency application, the brake switch may be first turned to service application position, in which the service magnet 23 is energized to effect the opening of valve 24. Fluid is then vented from the spring side of relay valve 32 to passage 22, and thence past the valve 24 to passage 26 which is connected to the brake pipe in the emergency position of slide valve 15, through passage 28 and cavity 45, to passage 46 and thence past check valve 46$^a$ to brake pipe passage 9.

The relay valve 32 is then opened, so that fluid is supplied to the brake pipe directly from the main reservoir 6.

Upon movement of the emergency piston 11 to release position, the passage 46 is cut off from passage 28 and the further recharging of the brake pipe can take place by way of port 39 and passage 40.

A pneumatic emergency application of the brakes may be effected by reducing the pressure in the brake pipe, so that fluid is vented from piston chamber 8 past check valve 10 to the brake pipe and the emergency valve 15 is then operated to supply fluid to the brake cylinder as in an electric emergency application of the brakes.

The passage 40 is provided with a restricted portion 41, so that when the brake pipe pressure is reduced to effect an emergency application of the brakes, the pressure in valve chamber 12 will not be reduced at a rate tending to prevent the movement of piston 11 to emergency position.

Passage 18 is restricted at 19, so that when a reduction in brake pipe pressure is made to effect an emergency application of the brakes, fluid will not flow through passage 18 to piston chamber 8 at such a rate as might interfere with obtaining the necessary reduction therein to effect the movement of piston 11 to emergency position.

Check valve 10 prevents a reduction in brake pipe pressure during an electrically initiated emergency application of the brakes, since the pressure is then only reduced in piston chamber 8.

Check valve 46$^a$ prevents the brake pipe from being vented to the atmosphere, in case the slide valve 15 is in emergency position and the release valve 30 should happen to be in open position.

Check valve 27 prevents loss of fluid from the main reservoir 6, in case the service valve 24 should stick open when the emergency magnet valve 17 is open to effect an emergency application of the brakes.

Having now described my invention, what I claim as new and desire to secure by Letters Patent, is:—

1. In a fluid pressure brake, the combination with a brake pipe, of a valve device for effecting an emergency application of the brakes and adapted in emergency position to establish communication for supplying fluid to the brake pipe in releasing the brakes and means operated upon effecting an emergency application of the brakes for cutting off the supply of fluid through said communication.

2. In a fluid pressure brake, the combination with a brake pipe and an emergency valve device operated upon a reduction in brake pipe pressure for effecting an emergency application of the brakes and adapted in emergency position to establish communication for supplying fluid to the brake pipe, of a service magnet valve device for supplying fluid through said communication and an emergency magnet valve device for also controlling said communication.

3. In a fluid pressure brake, the combination with a brake pipe and an emergency valve device operated upon a reduction in brake pipe pressure for effecting an emergency application of the brakes and adapted in emergency position to establish communication for supplying fluid to the brake pipe, of an electrically controlled valve for effecting a service application of the brakes and adapted to supply fluid through said communication and an electrically controlled valve for effecting an emergency application of the brakes and adapted in emergency position to cut off the flow of fluid through said communication.

4. In a fluid pressure brake, the combination with a brake pipe, a fluid pressure supply reservoir, and an emergency valve device operated upon a reduction in brake pipe pressure for effecting an emergency application of the brakes, of an emergency magnet valve device having one position for venting fluid from said emergency valve device to effect an emergency application of the brakes and another position for supplying fluid from said reservoir to said emergency valve device to effect the release of the brakes.

5. In a fluid pressure brake, the combination with a brake pipe and an emergency valve device operated upon a reduction in brake pipe pressure for effecting an emergency application of the brakes, of an emergency magnet valve device for also venting fluid from emergency valve device for effecting an emergency application of the brakes, and a check valve for preventing back flow from the brake pipe to said emergency valve device.

6. In a fluid pressure brake, the combination with a brake pipe, a brake cylinder, and an emergency valve device for effecting an emergency application of the brakes, of a service magnet valve device for supplying fluid to the brake cylinder in the release position of said emergency valve device and to the brake pipe in emergency position and an emergency magnet valve device adapted to control communication through which the service magnet valve device supplies fluid.

In testimony whereof I have hereunto set my hand.

WALTER V. TURNER.